(12) United States Patent
Arnold et al.

(10) Patent No.: US 8,127,537 B2
(45) Date of Patent: Mar. 6, 2012

(54) EXHAUST SYSTEM FOR A SPARK-IGNITED INTERNAL COMBUSTION ENGINE

(75) Inventors: Louise Clare Arnold, Hertfordshire (GB); Marie Charlotte Clements, Cambridge (GB); Neil Robert Collins, Litlington (GB); Darrell Morris, Cumbria (GB)

(73) Assignee: Johnson Matthey Public Limited Company, London (GB)

( * ) Notice: Subject to any disclaimer, the term of this patent is extended or adjusted under 35 U.S.C. 154(b) by 718 days.

(21) Appl. No.: 12/280,939

(22) PCT Filed: Feb. 27, 2007

(86) PCT No.: PCT/GB2007/050087
§ 371 (c)(1),
(2), (4) Date: Aug. 27, 2008

(87) PCT Pub. No.: WO2007/099368
PCT Pub. Date: Sep. 7, 2007

(65) Prior Publication Data
US 2008/0314034 A1    Dec. 25, 2008

(30) Foreign Application Priority Data
Feb. 28, 2006 (GB) .................................. 0603942.4

(51) Int. Cl.
*F01N 3/00* (2006.01)
*F01N 3/10* (2006.01)
*B01D 50/00* (2006.01)
*B01D 53/34* (2006.01)
*B01J 8/04* (2006.01)
*B01J 10/00* (2006.01)

(52) U.S. Cl. ............. 60/299; 60/276; 422/181; 422/636

(58) Field of Classification Search ................ 60/276, 60/299; 422/168, 169, 170, 171, 177, 181, 422/188–193, 600, 630, 631, 636
See application file for complete search history.

(56) References Cited

U.S. PATENT DOCUMENTS

| | | | |
|---|---|---|---|
| 5,043,311 A | 8/1991 | Engler et al. |
| 5,100,632 A | 3/1992 | Dettling et al. |
| 5,172,320 A | 12/1992 | Nada |
| 5,352,646 A | 10/1994 | Blanchard et al. |

(Continued)

FOREIGN PATENT DOCUMENTS
DE    23 30 749 A1    1/1975

(Continued)

*Primary Examiner* — Thomas Denion
*Assistant Examiner* — Audrey K Bradley
(74) *Attorney, Agent, or Firm* — Kevin M. Carroll; RatnerPrestia (57) ABSTRACT

An exhaust system for a spark-ignited internal combustion engine comprises a three-way catalyst composition including an oxygen storage component, which TWC composition is coated on a flow-through monolith substrate, which substrate comprising a plurality of channels, each channel having a length extending from an inlet end to an outlet end and a single lambda sensor, wherein the substrate comprises a portion of the plurality of channels wherein the TWC composition in at least a part of the length of channels extending from the inlet end has a reduced oxygen storage activity, or no oxygen storage activity, relative to the TWC composition in a remainder of the substrate, the arrangement being such that the single lambda sensor is contacted substantially only with exhaust gas that has first contacted the TWC composition having a reduced oxygen storage activity or no oxygen storage activity.

9 Claims, 6 Drawing Sheets

U.S. PATENT DOCUMENTS

| | | | |
|---|---|---|---|
| 5,363,091 | A | 11/1994 | Kotwicki et al. |
| 6,037,183 | A | 3/2000 | Faber et al. |
| 6,087,298 | A * | 7/2000 | Sung et al. ............... 502/333 |
| 6,274,107 | B1 | 8/2001 | Yavuz et al. |
| 6,332,965 | B1 | 12/2001 | Sugiyama et al. |
| 6,632,764 | B2 | 10/2003 | Drückhammer et al. |
| 2002/0172625 | A1* | 11/2002 | Nakajima et al. ........... 422/177 |
| 2003/0072694 | A1 | 4/2003 | Hodgson et al. |
| 2004/0001782 | A1* | 1/2004 | Kumar et al. ............. 422/180 |
| 2004/0226281 | A1 | 11/2004 | Coillard |
| 2005/0022382 | A1* | 2/2005 | Bruck et al. ............... 29/890 |
| 2006/0144039 | A1 | 7/2006 | Rigaudeau |
| 2006/0165567 | A1* | 7/2006 | Bruck et al. ............... 422/168 |
| 2007/0074503 | A1 | 4/2007 | Odendall |

FOREIGN PATENT DOCUMENTS

| | | |
|---|---|---|
| DE | 26 43 739 A1 | 3/1978 |
| DE | 26 43 739 A1 | 3/1978 |
| DE | 88 16 154 U1 | 3/1989 |
| DE | 41 00 241 A1 | 7/1991 |
| DE | 40 22 546 A1 | 1/1992 |
| DE | 199 46 044 C1 | 1/2001 |
| DE | 103 45 896 A1 | 4/2005 |
| DE | 10 2005 020 963 A1 | 11/2006 |
| EP | 0 430 744 A1 | 6/1991 |
| EP | 0 459 534 A1 | 12/1991 |
| EP | 0 560 991 A1 | 9/1993 |
| EP | 0 658 368 A1 | 6/1995 |
| EP | 1 054 722 B1 | 11/2000 |
| EP | 1 057 519 A1 | 12/2000 |
| GB | 2 290 488 A | 1/1996 |
| GB | 2 452 354 A | 3/2009 |
| IE | 904093 | 6/1991 |
| JP | 5-49940 | 3/1993 |
| JP | 10-252450 A | 9/1998 |
| WO | WO-99/47260 A1 | 9/1999 |
| WO | WO-01/80978 A1 | 11/2001 |
| WO | WO-2004/070177 A1 | 8/2004 |
| WO | WO 2005038207 A1 * | 4/2005 |
| WO | WO-2005/064139 A1 | 7/2005 |
| WO | WO-2007/099368 A1 | 9/2007 |

* cited by examiner

EXHAUST SYSTEM FOR A SPARK-IGNITED INTERNAL COMBUSTION ENGINE

CROSS-REFERENCE TO RELATED APPLICATIONS

This application is the U.S. National Phase application of PCT International Application No. PCT/GB2007/050087, filed Feb. 27, 2007, and claims priority of British Patent Application No. 0603942.4, filed Feb. 28, 2006, both of which are incorporated herein by reference.

FIELD OF THE INVENTION

The present invention relates to an exhaust system for a spark-ignited internal combustion engine comprising a three-way catalyst (TWC) composition including an oxygen storage component (OSC), which TWC composition is coated on a flow-through monolith substrate, which substrate comprising a plurality of channels, each channel having a length extending from an inlet end to an outlet end, and a single lambda sensor.

BACKGROUND OF THE INVENTION

As is well known in the art, the quantity of carbon monoxide (CO), unburned hydrocarbons (HC) and nitrogen oxides ($NO_x$) emitted when gasoline fuel is combusted in a spark-ignited internal combustion engine is influenced predominantly by the air-to-fuel ratio in the combustion cylinder. An exhaust gas having a stoichiometrically balanced composition is one in which the concentrations of oxidising gases ($NO_x$ and $O_2$) and reducing gases (HC and CO) are substantially matched. The air-to-fuel ratio that produces the stoichiometrically balanced exhaust gas composition is typically given as 14.7:1.

Theoretically, it should be possible to achieve complete conversion of $O_2$, $NO_x$, CO and HC in a stoichiometrically balanced exhaust gas composition to $CO_2$, $H_2O$ and $N_2$ and this is the duty of a so-called three-way catalyst. Ideally, therefore, the engine should be operated in such a way that the air-to-fuel ratio of the combustion mixture produces the stoichiometrically balanced exhaust gas composition.

Another way of defining the compositional balance between oxidising gases and reducing gases of the exhaust gas is the lambda (λ) value of the exhaust gas, defined according to equation (1) as:

$$\text{Actual engine air-to-fuel ratio/Stoichiometric engine air-to-fuel ratio,} \quad (1)$$

wherein a lambda value of 1 represents a stoichiometrically balanced (or stoichiometric) exhaust gas composition, wherein a lambda value of >1 represents an excess of $O_2$ and $NO_x$ and the composition is described as "lean" and wherein a lambda value of <1 represents an excess of HC and CO and the composition is described as "rich". It is also common in the art to refer to the air-to-fuel ratio at which the engine operates as "stoichiometric", "lean" or "rich", depending on the exhaust gas composition which the air-to-fuel ratio generates: hence stoichiometrically-operated gasoline engine or lean-burn gasoline engine.

It should be appreciated that the reduction of $NO_x$ to $N_2$ using a TWC is less efficient when the exhaust gas composition is lean of stoichiometric. Equally, the TWC is less able to oxidise CO and HC when the exhaust gas composition is rich. The challenge, therefore, is to maintain the composition of the exhaust gas flowing into the TWC at as close to the stoichiometric composition as possible.

Of course, when the engine is in steady state it is relatively easy to ensure that the air-to-fuel ratio is stoichiometric. However, when the engine is used to propel a vehicle, the quantity of fuel required changes transiently depending upon the load demand placed on the engine by the driver. This makes controlling the air-to-fuel ratio so that a stoichiometric exhaust gas is generated for three-way conversion particularly difficult. In practice, the air-to-fuel ratio is controlled by an engine control unit, which receives information about the exhaust gas composition from an exhaust gas oxygen (EGO) (or lambda) sensor: a so-called closed loop feedback system. A feature of such a system is that the air-to-fuel ratio oscillates (or perturbates) between slightly rich of the stoichiometric (or control set) point and slightly lean, because there is a time lag associated with adjusting air-to-fuel ratio. This perturbation is characterised by the amplitude of the air-to-fuel ratio and the response frequency (Hz).

The active components in a typical TWC comprise one or both of platinum and palladium and rhodium supported on a high surface area oxide.

When the exhaust gas composition is slightly rich of the set point, there is a need for a small amount of oxygen to consume the unreacted CO and HC, i.e. to make the reaction more stoichiometric. Conversely, when the exhaust gas goes slightly lean, the excess oxygen needs to be consumed. This was achieved by the development of the oxygen storage component which liberates or absorbs oxygen during the perturbations. The most commonly used oxygen storage component (OSC) in modern TWCs is cerium oxide ($CeO_2$) or a mixed oxide containing cerium, e.g. a Ce/Zr mixed oxide.

A typical sensor arrangement for a modern TWC is to dispose a first lambda sensor for contacting exhaust gas on an upstream side of the TWC and a second lambda sensor for contacting exhaust gas on a downstream side of the TWC, i.e. to contact exhaust gas leaving the TWC. The first sensor is used to control the air-to-fuel ratio of the engine by closed loop control by inputting the sensor reading to an engine control unit. Principally, the second sensor is used for two purposes: to "trim" the control of the air-to-fuel ratio of the engine, which is the primarily the purpose of the first lambda sensor; and for use in on board diagnostics.

On board diagnostic systems are used continuously to monitor vehicular exhaust gas aftertreatment devices, such as TWCs, in order to report and set fault codes or alarm signals when the devices no longer meet prescribed emission standards.

Lambda sensors are expensive and it has been suggested recently to remove one lambda sensor and run the system on a single lambda sensor disposed within or immediately downstream of the TWC (see for example WO 2005/064139, the entire contents of which is incorporated herein by reference). Not only can this make the system overall less costly, but it is believed that, by locating the single lambda probe more intimately with the TWC, it is possible to reduce the time lag associated with adjusting air-to-fuel ratio, to control the lambda value of the exhaust gas more accurately and thereby increase the conversion efficiency. It may even be possible to use smaller TWCs comprising less of the expensive precious metal active components.

SUMMARY OF THE INVENTION

We have now developed a TWC concept for use in connection with exhaust systems comprising a single lambda sensor that can enable the system as a whole to react more quickly to changes in the redox composition of the exhaust gas, thereby enabling more exact closed-loop feedback control of the engine air-to-fuel ratio.

According to one aspect, there is provided an exhaust system for a spark-ignited internal combustion engine comprising:

(a) a three-way catalyst composition including an oxygen storage component, which TWC composition is coated on a flow-through monolith substrate, which substrate comprising a plurality of channels, each channel having a length extending from an inlet end to an outlet end; and (b) a single lambda sensor, wherein the substrate comprises a portion of the plurality of channels wherein the TWC composition in at least a part of the length of channels extending from the inlet end has a reduced oxygen storage activity, or no oxygen storage activity, relative to the TWC composition in a remainder of the substrate, the arrangement being such that the single lambda sensor is contacted substantially only with exhaust gas that has first contacted the TWC composition having a reduced oxygen storage activity or no oxygen storage activity.

BRIEF DESCRIPTION OF THE DRAWINGS

In order that the invention may be more fully understood, illustrative embodiments whereof will now be described with reference to the accompanying drawings, in which.

In one embodiment, the portion of the plurality of channels is annular in shape, but in a particular embodiment, the portion of the plurality of channels is segmental in shape (see also the attached Figures). The flow-through substrate monolith can be made either of ceramic material or from a metal having any suitable cell density e.g. 200-1200 cells per square inch. Apparatus and methods of obtaining such arrangements of coating are known, e.g. from our WO 99/47260.

In a further embodiment the lambda sensor is disposed in a hole defined in part by an external wall of the flow-through monolith substrate because some of the channels of the flow-through monolith do not extend all the way through substrate. However, it is relatively difficult in processing terms to coat with a TWC composition a flow-through substrate with a hole drilled in the external wall thereof. Coating the substrate first before drilling the hole for receiving the lambda sensor also creates problems in that expensive PGM metal can be lost in the dust from the drilled substrate. Furthermore, PGM coated dust is an allergen and represents a health and safety hazard to factory workers.

Accordingly, in a particular embodiment, the portion of the plurality of channels extends from the inlet end to the outlet end of the substrate and the lambda sensor is located immediately downstream of the outlet end, the exhaust system comprising means substantially to prevent exhaust gas other than exhaust gas flowing in the portion of the plurality of channels from contacting the lambda sensor.

Using a single lambda sensor located within, or downstream of, the TWC substrate, presents the problem of how to control the engine air-to-fuel ratio to a similar extent as is provided by a prior art system wherein one lambda sensor is located upstream of the TWC substrate and another is located downstream. The present invention solves this problem by allowing the single lambda sensor to "see" exhaust gas that has contacted less, or no, OSC. Accordingly the system is able to react to macro fluctuations in exhaust gas composition more quickly than if the single lambda sensor was located downstream of a "normal" TWC substrate, i.e. a substrate that is homogeneously coated with a TWC composition. This increases the level of control and design options available to the skilled engineer.

The means for substantially preventing contact of exhaust gas with the lambda sensor located downstream of the TWC can comprise a deflector for receiving and surrounding the lambda sensor, which deflector is open at an upstream end and a downstream end. The deflector can take many forms, but in one embodiment it comprises a strip of shaped metal supported by an internal surface of a can within which the substrate is held.

The TWC composition for use in the present invention typically comprises a combination of two or more platinum group metals (PGMs), generally Pt/Rh, Pd/Rh or Pt/Pd/Rh. Total PGM loadings can range from as low as about 2 gft$^{-3}$ to 300 gft$^{-3}$, although total PGM in Pt/Rh compositions is generally <100 gft$^{-3}$. Total PGM loadings in Pd/Rh systems can be higher, e.g. <300 gft$^{-3}$. The OSC component can comprise up to 1000 gft$^{-3}$ cerium of a washcoat comprising the TWC composition for coating the flow-through monolith. The PGMs and any catalyst promoters used, e.g. barium-based compound, are supported by one or both of the OSC, e.g. a Ce/Zr mixed or composite oxide, and a high surface area oxide, e.g. alumina.

However, the TWC composition having reduced oxygen storage activity can have one or both of:

(i) a lower oxygen storage component loading than the TWC composition in the remainder of the substrate; and/or (ii) a lower total PGM loading than the TWC composition in the remainder of the substrate. This is because it is believed that PGMs contribute to the activity of the OSC by adsorbing oxygen from the exhaust gas at the active sites on the PGM surface, which adsorbed oxygen is then transferred to the OSC. By retaining some OSC activity, the single sensor can also be used for OBD.

Where the TWC composition has no oxygen storage activity, this can be done either by including no oxygen storage component and/or no PGM.

According to another aspect, there is provided an apparatus comprising a spark-ignited internal combustion engine and an exhaust system according to the invention. The engine can be a stoichiometrically-operated gasoline engine or a lean-burn gasoline engine, such as a GDI (gasoline direct injection) or DISI engine.

Recent advances in engine management and exhaust gas aftertreatment have led to the realisation of engines capable of operating lean of stoichiometric over a significant part of their drive cycle. The advantage is that the vehicle manufacturer is able to provide vehicles that more readily achieve legislated emissions standards for CO and HC and the customer benefits from the improved fuel consumption. However, as discussed above, the technical difficulty is in finding ways of treating $NO_x$ in lean exhaust gas.

One solution is to use an exhaust system component referred to as a lean $NO_x$ trap or simply a $NO_x$ trap. The composition of a $NO_x$ trap is similar to that of a TWC composition, in that it comprises a catalyst for oxidising NO to $NO_2$, typically platinum; and a catalyst, such as rhodium, for promoting the reduction of $NO_x$ to $N_2$ in the presence of a reductant, e.g. HC. Contrastingly, the $NO_x$ trap generally does not include an OSC. The significant difference between a TWC composition and a $NO_x$ trap composition, however, is that the $NO_x$ trap composition has significant quantities of compounds of basic metals, e.g. barium, strontium, potassium, for absorbing $NO_x$ during lean running operation of the engine. The mechanism often given for the reaction is that NO contacts oxygen bound to active sites on the platinum, forming $NO_2$ and the $NO_2$ is then absorbed on the basic metal oxide to form, and effectively to "store" the $NO_x$, as the nitrate. See for example EP 0560991 (the entire contents of which are incorporated herein by reference).

Of course, the ability of the $NO_x$ trap to absorb (or adsorb) $NO_x$ is limited by the amount of basic metal compounds present in the composition. In order to remove the $NO_x$, thereby to "regenerate" the ability of the $NO_x$ trap composition to absorb $NO_x$, engine management is used periodically and momentarily to enrich the exhaust gas with unburned HC. The basic metal nitrate is understood to be unstable in the reducing atmosphere and $NO_x$ is released therefrom to be reduced to $N_2$ in the reducing atmosphere catalysed by the rhodium component.

It is understood that the exhaust system for treating exhaust gas from a lean burn gasoline engine fitted with a $NO_x$ trap comprises a TWC located close to the engine. The duty of the TWC is to treat $NO_x$ during $NO_x$ trap regeneration and the exhaust gas generally when the engine is operated closer to, or at, the stoichiometric point, e.g. during cold-start in order to warm up the exhaust system components or during fast motorway driving. For the avoidance of any doubt, the exhaust system of the present invention is for treating exhaust gas from stoichiometrically-operated spark-ignited engines and lean-burn spark-ignited engines, wherein the exhaust system may include a $NO_x$ trap.

According to another aspect, there is provided a vehicle comprising an apparatus according to the invention.

U.S. Pat. No. 5,352,646 discloses supported catalysts adapted for the catalytic conversion of exhaust gases from internal combustion engines, comprising a porous carrier material, e.g. alumina spheres, such porous carrier material having a catalytically effective amount of at least one non-platinum group catalytically active element, e.g. cerium, essentially homogeneously concentrated throughout the depth of a defined peripheral face surface layer (outer band or ring) thereof.

According to another aspect, there is provided a flow-through monolith substrate comprising a plurality of channels coated with a three-way catalyst composition including an oxygen storage component, each channel having a length extending from a first end to a second end, wherein at least a part of the length of channels extending from the first end in a portion of the plurality of channels is coated with a catalyst composition comprising at least one platinum group metal having a reduced oxygen storage activity relative to a remainder of the substrate.

In one embodiment, the flow-through monolith substrate comprises an external wall associated with the portion, which wall defining in part a hole for receiving a single lambda sensor therein.

Figure 1:
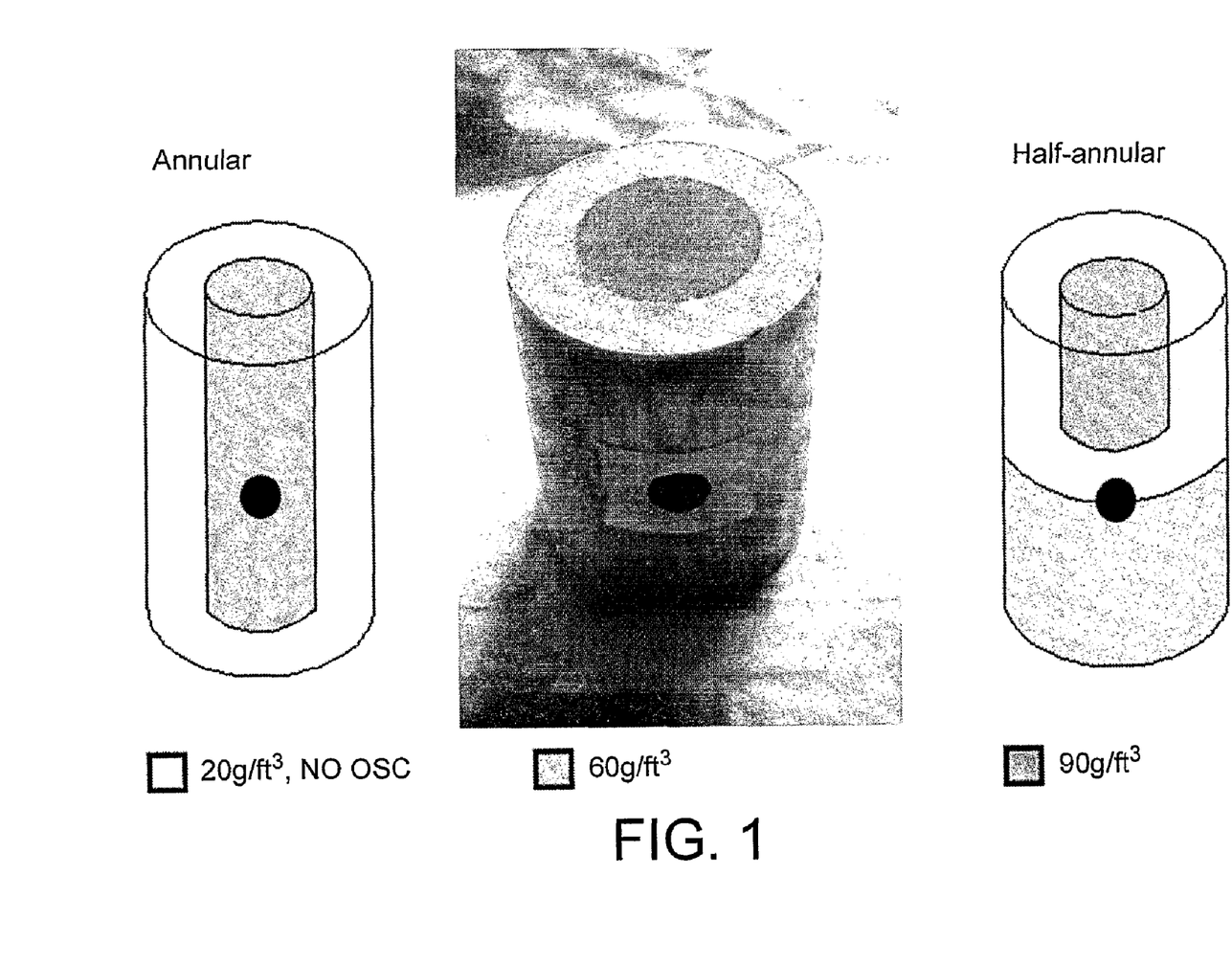
FIG. 1 shows two embodiments of the TWC substrate wherein the portion of the plurality of channels is annular in shape.

Referring to FIG. 1, there is shown two embodiments of a TWC substrate according to the invention featuring, on the left hand side, an embodiment wherein an annular portion of the plurality of channels is coated over their entire length, i.e. from a first inlet end to a second outlet end, with a TWC composition having no OSC and 20 $gft^{-3}$ total PGM loading. The remainder of the substrate (the cylindrically shaped core) is coated with a TWC composition comprising an OSC and a total of 90 $gft^{-3}$ PGM. The black dot in the Figure represents a hole defined in part by an external wall of the substrate associated with the portion of the plurality of channels having no OSC and 20 $gft^{-3}$ total PGM loading. The hole, for receiving the lambda sensor, is located at approximately half way along the length of the substrate channels between the first inlet end and the second outlet end, as can be seen from the central photograph.

The embodiment shown on the right hand side of FIG. 1 is coated to half of its length extending from a first inlet end similarly to the embodiment previously discussed, i.e. annular TWC composition having no OSC and 20 $gft^{-3}$ total PGM loading and a central, cylindrical core of 90 $gft^{-3}$. The other half (that extending from the second outlet end) is coated with a TWC composition comprising an OSC and 60 $gft^{-3}$ PGM. In practice, the first inlet end of this substrate comprising the annular TWC composition having 20 $gft^{-3}$ and no OSC is oriented to the upstream side in the exhaust system.

Figure 2:
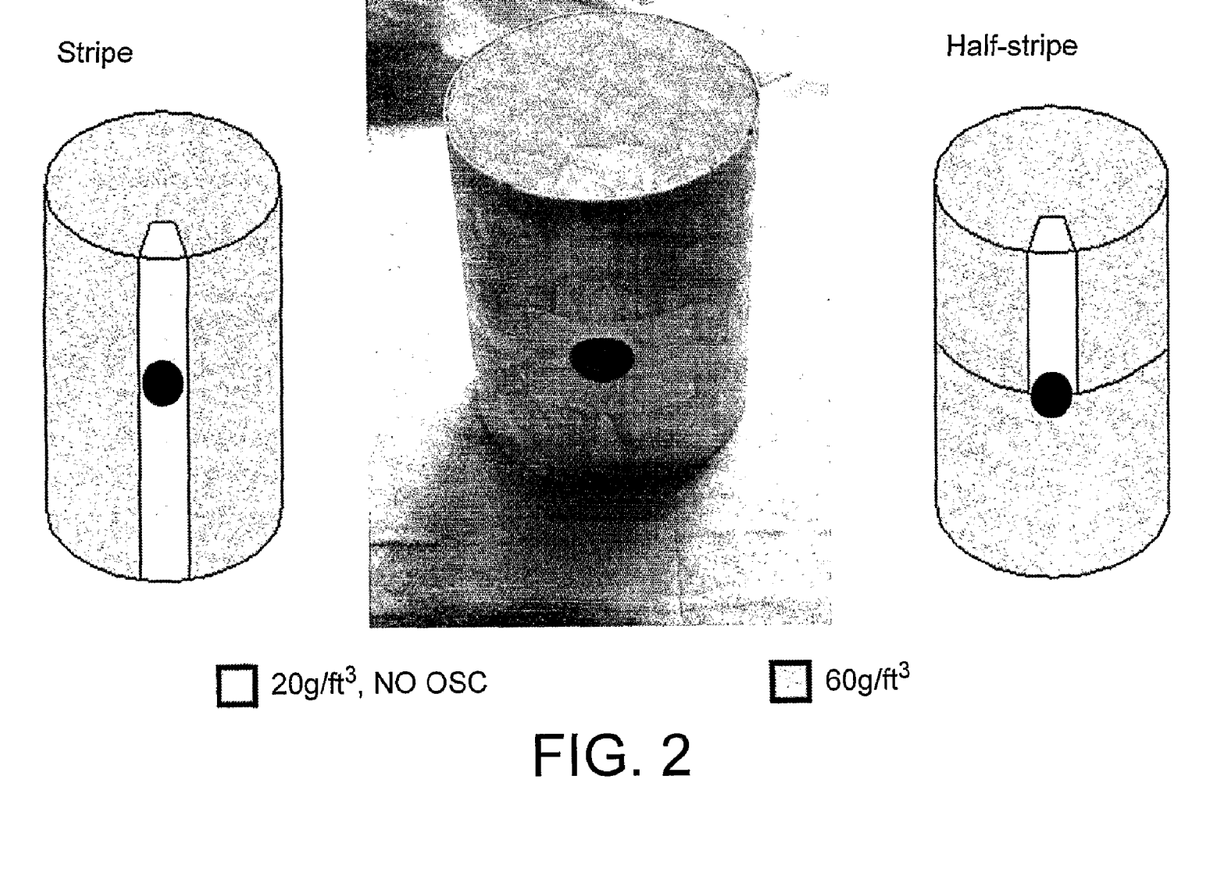
FIG. 2 shows two embodiments of the TWC substrate wherein the portion of the plurality of channels is segmental (or striped) in shape.

Referring to FIG. 2, the embodiment shown on the left hand side shows a segmental portion of the substrate coated over the entire length of its channels with a TWC composition comprising no OSC and a total of 20 $gft^{-3}$ PGM loading. The remainder of the substrate is coated with a TWC composition comprising 60 $gft^{-3}$ total PGM loading and an OSC. As discussed above, the black dot associated with the segment portion represents a hole for receiving a lambda sensor. This embodiment is referred to as a "stripe" embodiment.

The embodiment shown in the right hand side is a "half-stripe" embodiment, wherein the substrate is coated to about half of the length of the channels in the segment portion with the TWC composition comprising no OSC and a total of 20 $gft^{-3}$ PGM loading and the remainder of the substrate is coated with the TWC composition comprising the OSC and 60 $gft^{-3}$ total PGM. In use, the substrate will be mounted in the exhaust system so that the "half-stripe" end faces upstream. However, for the purposes of assessing the affect of reducing the total OSC content in the substrate compared with a homogeneously coated substrate, in illustrative Examples 1 and 2 presented hereinbelow, the proposed "in use" orientation is compared with the arrangement wherein the half stripe end faces downstream.

EXAMPLES

The following Examples are provided by way of illustration only.

EXAMPLE 1

Figure 3:
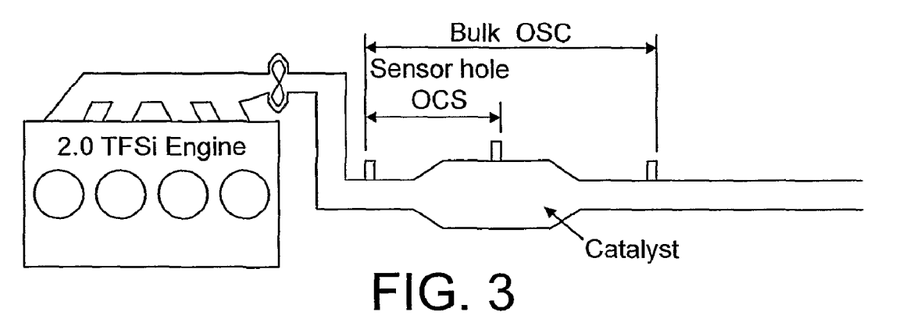
FIG. 3 is a schematic showing an apparatus used to test the concept of the invention.

An OSC test was performed on the apparatus shown in FIG. 3. The engine used was a bench-mounted 2.0 TFSi engine. 4.66×5 inch (11.8×12.7 cm), 400 cells per square inch (62 cells cm$^{-2}$) ceramic substrates were used. The TWC substrate to be tested was put into a demountable catalyst can having a lambda sensor boss to be aligned with the sensor hole in the external wall of the substrate, shown in FIG. 4. The demountable can and substrate was inserted into the exhaust system of the engine. The system also comprised lambda sensors located both upstream and downstream of the TWC substrate, in the normal way. Data were collected comparing the OSC derived from readings taken from the sensor hole only with the OSC derived from the substrate as a whole, i.e. between the upstream and downstream lambda sensors.

Figure 4:
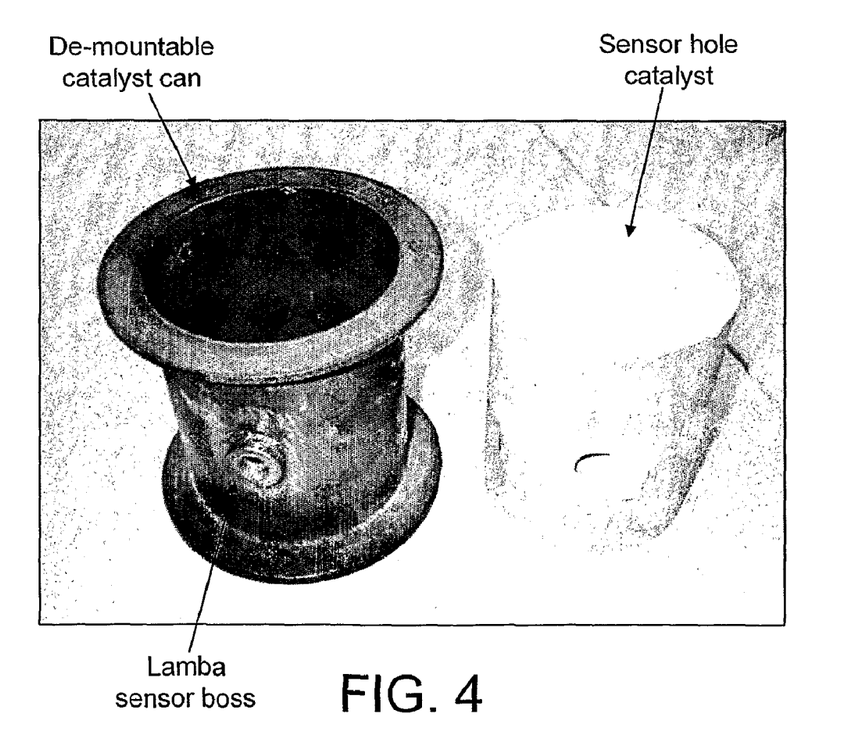
FIG. 4 shows the arrangement of substrate and catalyst can used in the apparatus represented in FIG. 3.

The OSC test was performed with the engine running at a steady state of 200 rpm and 93 Nm load. This gave a catalyst inlet temperature of about 580° C. The engine control unit was programmed to switch the engine between lambda 0.95 and 1.05. The time difference between the lambda sensors switching (Delta T) is used to calculate the OSC from equation (2):

$$OSC(mg) = Delta\ T(s) * Exhaust\ mass\ flow(kg/h) * Delta\ lambda(\%) * 0.64 \quad (2)$$

Tests were conducted on four TWC arrangements. For the purposes of comparison, a homogeneously coated (or normal) TWC substrate was used. Two embodiments of the TWC substrate according to the invention were tested: the annular arrangement shown in FIG. 1, left-hand side and the half stripe arrangement shown in FIG. 2, right-hand side. The fourth test was conducted on the half-stripe embodiment, wherein the substrate was mounted in the opposite (or inverted) direction to the intended use in practice. This was to confirm that the OSC reading for the channels upstream of the lambda sensor in the half-stripe inverted test (coated with "normal" TWC composition) gave a similar reading to that of the homogeneously coated TWC substrate. Tests were performed on both fresh and aged catalysts. Catalysts were aged at 1000° C. for 4 hours in a gas mixture consisting of 2% $O_2$, 10% $H_2O$ and $N_2$ balance.

Figure 5:
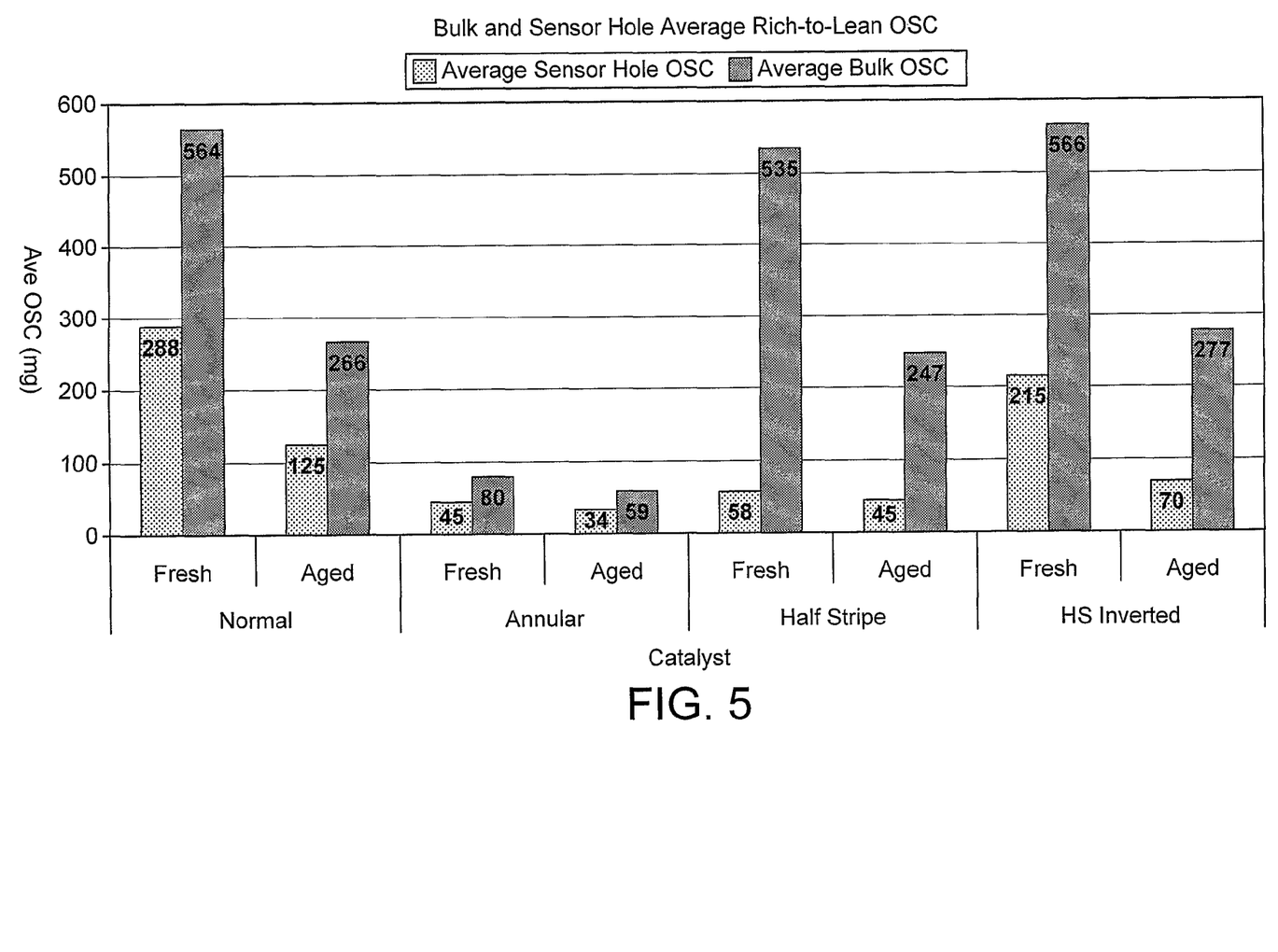
FIG. 5 is a bar graph showing the results of bulk and sensor hole average rich-to-lean OSC for a homogeneously coated (normal) TWC substrate and embodiments of TWC substrates according to the invention.

The results are shown in FIG. 5. For the homogenous catalyst the mid-point sensor registered approximately half the total OSC measured by the bulk sensor and the half-stripe catalyst mid-point sensor registered nearly zero OSC with the 'No OSC' stripe before the catalyst. When inverted, the OSC measured in the half-stripe catalyst was statistically similar to that of the homogenous catalyst. The annular catalyst had lower OSC measured at either point. Calculated bulk OSC for the annular catalyst embodiment is ~⅓ of homogenous catalyst.

The results show that the half stripe embodiment displays similar OSC for the substrate as a whole while enabling closed loop control of the engine air-to-fuel ratio to be achieved with a single lambda sensor. It is believed that this is because, despite the substrate being mounted downstream of a cone-shaped diffuser, a majority of the gas flows through the substrate in a region of the substrate opposite an inlet. The annular embodiment is a viable, though less preferred, embodiment since the bulk OSC was reduced compared with the normal TWC substrate.

EXAMPLE 2

A simple $O_2$ charge test was performed on the catalysts tested in Example 1 using the apparatus shown in FIG. 3, wherein the engine was set to run with perturbations cycling between: Lambda=1.02 for 10 seconds; Lambda=0.98 for 10 seconds.

The aim of the $O_2$ charge test was to investigate the emissions performance of the catalyst system when the OSC of the catalyst system is completely emptied and completely filled cyclically. The $O_2$ charge test was completed at 3 different engine conditions with 3 different OSC filling and emptying rates at each condition, as shown in the Table below. The OSC filling and emptying rates are dependent on the amplitudes of the lambda steps used for the OSC filling and emptying. The amplitudes used at each engine condition are ±1%, ±2% and ±5% giving lambda steps of 0.99-1.01, 0.98-1.02 and 0.95-1.05 respectively. The time period for emptying and filling of the OSC is set to 20 seconds, i.e. 10 seconds lean followed by 10 seconds rich. This should give complete emptying and filling of the OSC for aged catalyst systems. This may need to be increased if fresh catalyst systems are to be tested.

Following the standard engine start and warm up procedure the engine was ramped to the first condition and the catalyst temperatures given time to stabilize. The desired lambda step was set using the map LRSMODMS. The time period LRST-PZA was set to 20 seconds. A further 1 minute was allowed for catalyst temperature stabilization before 3 minutes 20 seconds of data was logged. This process was repeated for all the required lambda steps and engine conditions. Conversion efficiencies for CO and $NO_x$ are calculated from the emissions data. Average conversion efficiencies are calculated over 100 seconds of logging (5 complete periods of: 10 seconds lean followed by 10 seconds rich).

|  | Condition No. | | |
| --- | --- | --- | --- |
|  | 1 | 2 | 3 |
| Engine Speed (rpm) | 3000 | 3000 | 3000 |
| Torque (Nm) | 30 | 72 | 135 |
| Exhaust Mass Flow (kg/h) | 50 | 95 | 160 |

Figure 6:
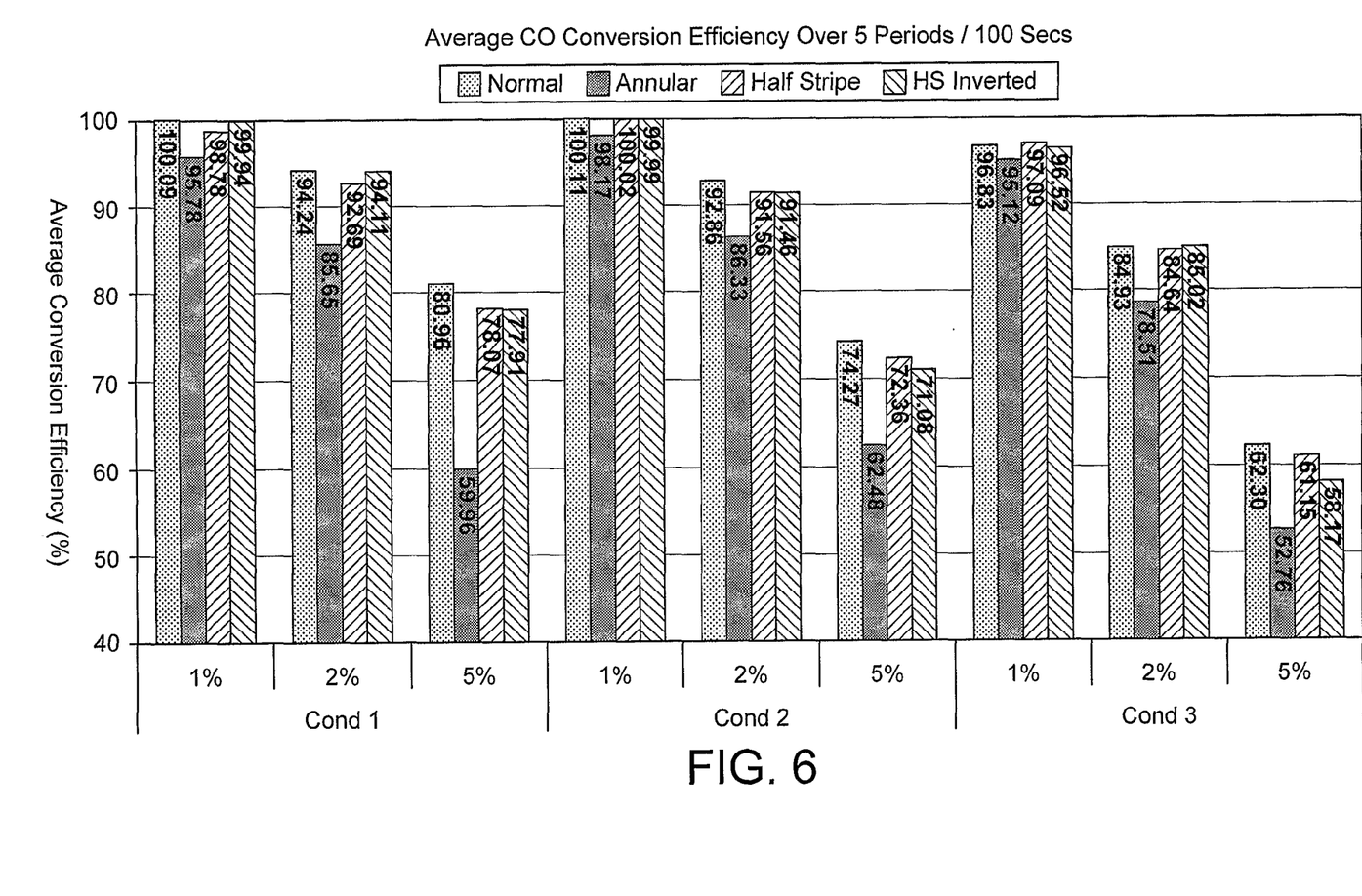
FIG. 6 is a bar graph showing the average CO conversion efficiency results for an O2 charge test comparing a homogeneously coated (normal) TWC substrate and embodiments of TWC substrates according to the invention.
Figure 7:
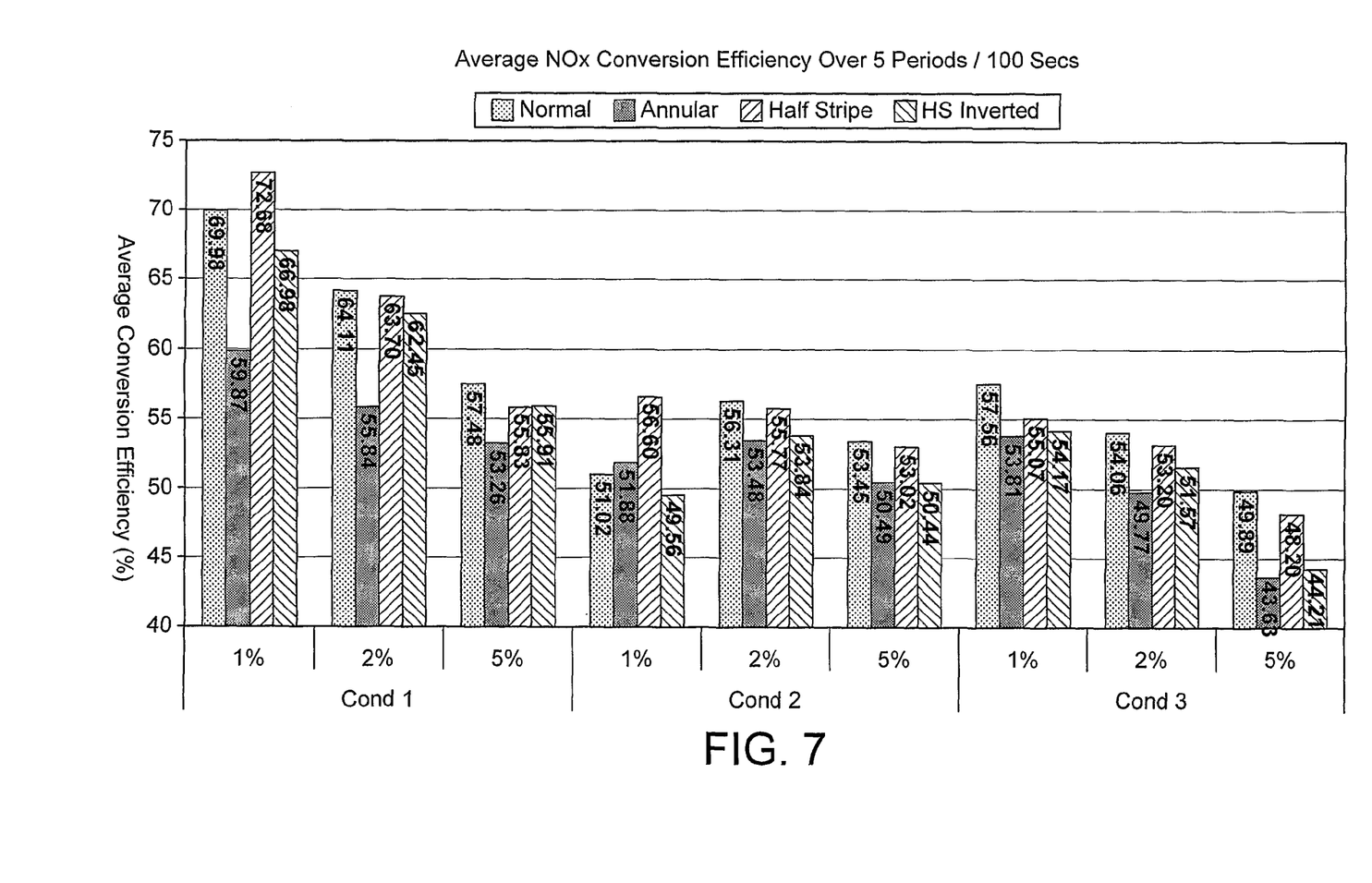
FIG. 7 is a bar graph showing the average NOx conversion efficiency results for an O2 charge test comparing a homogeneously coated (normal) TWC substrate and embodiments of TWC substrates according to the invention.

Conversion efficiencies of $NO_x$ and CO were calculated from collected emissions data and the results are shown in FIGS. 6 and 7. As can be seen, the homogenous and half-stripe catalysts show similar performance; orientation of half-stripe had little impact on conversion efficiency. Similarly to Example 1, the annular catalyst embodiment shows lower performance.

The invention claimed is:

1. An exhaust system for a spark-ignited internal combustion engine comprising:
   (a) a three-way catalyst (TWC) composition including an oxygen storage component, wherein the TWC composition is coated on a flow-through monolith substrate, the substrate comprises a plurality of channels, and each channel has a length extending from an inlet end to an outlet end; and
   (b) a single lambda sensor,
   wherein the substrate comprises a portion of the plurality of channels, wherein the portion of the plurality of channels is annular in shape, wherein the TWC composition in at least a part of the length of channels extending from the inlet end has a reduced oxygen storage activity, or no oxygen storage activity, relative to the TWC composition in a remainder of the substrate, the arrangement being such that the single lambda sensor is contacted substantially only with exhaust gas that has first contacted the TWC composition having a reduced oxygen storage activity or no oxygen storage activity.

2. An exhaust system according to claim 1, wherein the lambda sensor is disposed in a hole defined in part by an external wall of the flowthrough monolith substrate.

3. An exhaust system according to claim 1, wherein the TWC composition having reduced oxygen storage activity has one or both of:
(i) a lower oxygen storage component loading than the TWC composition in the remainder of the substrate; or
(ii) a lower total platinum group metal loading than the TWC composition in the remainder of the substrate.

4. An exhaust system according to claim 1, wherein the TWC composition has no oxygen storage activity and has no oxygen storage component and/or no platinum group metals.

5. An exhaust system according to claim 1, wherein the TWC composition having reduced oxygen storage activity has both:
(i) a lower oxygen storage component loading than the TWC composition in the remainder of the substrate; and
(ii) a lower total platinum group metal loading than the TWC composition in the remainder of the substrate.

6. An exhaust system according to claim 1, wherein the portion of the plurality of channels extends from the inlet end to the outlet end of the substrate and the lambda sensor is located immediately downstream of the outlet end, the exhaust system comprising means substantially to prevent exhaust gas other than exhaust gas flowing in the portion of the plurality of channels from contacting the lambda sensor.

7. An exhaust system according to claim 6, wherein the means for substantially preventing contact of exhaust gas with the lambda sensor comprises a deflector for surrounding the lambda sensor, wherein the deflector is open at an upstream end and a downstream end.

8. An apparatus comprising a spark-ignited internal combustion engine and an exhaust system according to claim 1.

9. A vehicle comprising an apparatus according to claim 8.

* * * * *